(12) United States Patent
Yost et al.

(10) Patent No.: US 7,379,091 B2
(45) Date of Patent: May 27, 2008

(54) METHOD AND APPARATUS FOR COMPUTING AN IMAGE STABILITY MEASURE

(75) Inventors: Jason E. Yost, Windsor, CO (US);
Andrew C. Goris, Loveland, CO (US);
Daniel Bloom, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 764 days.

(21) Appl. No.: 10/427,300

(22) Filed: Apr. 30, 2003

(65) Prior Publication Data

US 2004/0218057 A1 Nov. 4, 2004

(51) Int. Cl.
*H04N 5/228* (2006.01)
(52) U.S. Cl. .............................. 348/208.1; 348/208.2; 396/52
(58) Field of Classification Search ......... 348/208.1–4; 396/52
See application file for complete search history.

(56) References Cited

U.S. PATENT DOCUMENTS

| | | | |
|---|---|---|---|
| 4,448,510 A | 5/1984 | Murakoshi | |
| 5,060,007 A | 10/1991 | Egawa | |
| 5,420,635 A * | 5/1995 | Konishi et al. | 348/362 |
| 6,047,134 A * | 4/2000 | Sekine et al. | 348/207.99 |
| 6,101,332 A | 8/2000 | Satoh | |
| 6,343,187 B1 | 1/2002 | Sato | |
| 6,345,152 B1 | 2/2002 | Sato | |
| 6,407,771 B1 | 6/2002 | Kanbara et al. | |
| 6,421,090 B1 * | 7/2002 | Jiang et al. | 348/452 |
| 6,434,325 B1 | 8/2002 | Noda et al. | |
| 6,476,861 B1 | 11/2002 | Min | |
| 6,487,369 B1 | 11/2002 | Sato | |
| 6,504,575 B1 | 1/2003 | Ramirez et al. | |
| 6,505,000 B2 | 1/2003 | Kitani | |
| 6,510,283 B1 | 1/2003 | Yamagishi | |
| 6,548,800 B2 * | 4/2003 | Chen et al. | 382/254 |
| 6,987,530 B2 | 1/2006 | McConica | |
| 2002/0028071 A1 | 3/2002 | Molgaard | |
| 2002/0163581 A1 | 11/2002 | Kitazawa et al. | |
| 2002/0180876 A1 | 12/2002 | Sobol | |

OTHER PUBLICATIONS

Donald J. Stavely, "Apparatus And Method For Reducing Image Blur In A Digital Camera," U.S. Appl. No. 10/339,132, filed Jan. 8, 2003, HP Pending application 100205074-1.

* cited by examiner

*Primary Examiner*—Lin Ye
*Assistant Examiner*—Gevell Selby

(57) ABSTRACT

A camera computes an image stability measure by measuring the variability of an edge-detect figure of merit evaluated from several immediate past photographs.

5 Claims, 6 Drawing Sheets

| | 0 | 1 | 2 | 3 | 4 | 5 | 6 | 7 |
|---|---|---|---|---|---|---|---|---|
| 0 | R | G | R | G | R | G | R | G |
| 1 | G | B | G | B | G | B | G | B |
| 2 | R | G | R | G | R | G | R | G |
| 3 | G | B | G | B | G | B | G | B |
| 4 | R | G | R | G | R | G | R | G |
| 5 | G | B | G | B | G | B | G | B |

METHOD AND APPARATUS FOR COMPUTING AN IMAGE STABILITY MEASURE

FIELD OF THE INVENTION

The present invention relates generally to photography.

BACKGROUND OF THE INVENTION

Image blur is a common problem in photography. Some common causes of blur in a photograph are subject motion, camera motion (shake), and focusing errors. Blur is a particular problem for casual or amateur photographers who may not know how to diagnose the causes of blur or how to change their photographic technique to improve their results. As new consumer camera models are being produced with zoom lenses capable of very long focal lengths, blur due to camera shake is especially troublesome.

Various devices and techniques have been proposed to help address the problem of image blur due to camera shake. For example, Murakoshi (U.S. Pat. No. 4,448,510) uses an accelerometer to detect camera shake, and provides an indication to the user of the camera if the acceleration exceeds a threshold level.

Satoh (U.S. Pat. No. 6,101,332) also senses camera shake, and combines the shake information with other camera parameters to estimate how much image blur might result. A set of light emitting diodes communicates the estimate to the photographer.

Another approach has been to automate the camera operation, and let the camera choose settings that will minimize blur. For example, Bolle et al. (U.S. Pat. No. 6,301,440) applies a variety of image analysis techniques in an attempt to improve several aspects of photographs. Sato (U.S. Pat. No. 6,487,369) monitors the camera shake and attempts to take a photograph at a time when the shake magnitude is at a local minimum, if possible.

Each of these approaches has its drawbacks. The above techniques may require the addition of expensive electromechanical components to a camera, thereby increasing the camera cost. The techniques may address only one potential cause of image blur. The techniques give the camera user little guidance about how to improve her photographs, and in fact, additional automation that reduces the photographer's control of the camera may even add to the mystery of why a particular photograph is blurred.

A solution to the problem of image blur is needed that also addresses these difficulties.

SUMMARY OF THE INVENTION

A camera computes an image stability measure by measuring the variability of an edge-detect figure of merit evaluated from several immediate past photographs.

DETAILED DESCRIPTION OF THE PREFERRED EMBODIMENT

This application is related to copending application Ser. No. 10/427,264, filed concurrently herewith, titled "Camera shake warning and feedback system that teaches the photographer", also assigned to Hewlett-Packard Development Company, L.P.

Figures 1, 2:
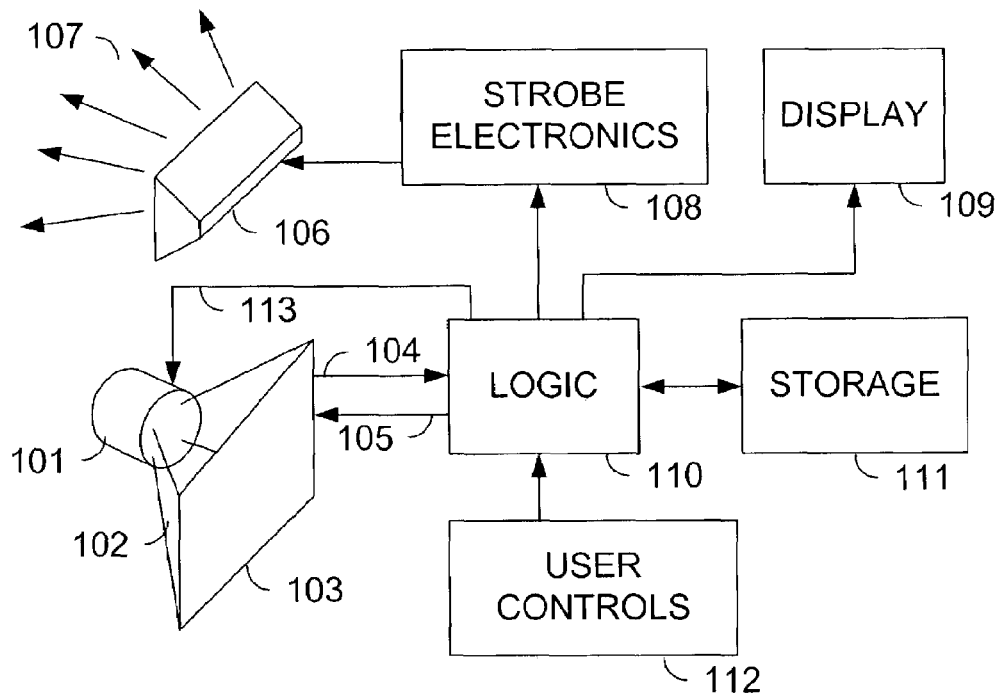
FIG. 1 depicts a block diagram of a camera.
FIG. 2 depicts a simplified schematic representation of an electronic array light sensor.

FIG. 1 depicts a block diagram of a camera. A lens 101 gathers light from a scene (not shown). The gathered light is redirected 102 to form an image of the scene on an electronic array light sensor 103. The sensor may be an array of CCD elements, CMOS sensors, or the like. The operation of the lens may be controlled by control signals 113 from a logic unit 110. Logic unit 110 may comprise a microprocessor system, digital signal processor, specialized hardware, or a combination of these. Likewise the operation of the sensor may be controlled by control signals 105 from logic unit 110. Image information signals 104 flow from the sensor to the logic unit 110. A flash, or strobe 106 may be utilized to supply additional light 107 to the scene. The strobe is operated by the strobe electronics 108, which in turn are controlled by the logic unit 110. The camera may comprise a display 109 on which image data or other information may be shown. The camera may comprise a storage unit 111 for storage and recall of image data, as well as data interchange with other devices (not shown). Storage unit 111 may comprise both volatile and non-volatile forms of data storage. The user of the camera may operate the camera through various user controls 112.

If the camera is a digital camera, sensor 103 may be the camera's primary digital sensor used for detecting camera shake before a final photograph is taken, determining exposure levels, providing focus feedback, and other functions, as well as taking the final photograph itself. If the camera is a film camera, sensor 103 may be used to gather digital images for exposure determination, shake detection, or other functions before a final photograph is taken, while the final photograph itself is recorded on film.

Lens 101 forms an image on sensor 103. That is, light from each location in the scene is projected onto a particular location on sensor 103. Sensor 103 may comprise an array of light-sensitive elements. Typically, each light-sensitive element accumulates electrical charge in proportion to the intensity of light falling on the element. It is sometimes said that each light-sensitive element "integrates light."

In typical operation, a photographic exposure may be accomplished by the following steps. First, the charge is emptied from the light-sensitive elements. Then light is permitted to fall onto sensor 103 for a measured exposure time. Because a scene image is projected onto sensor 103 by lens 101, light-sensitive elements geometrically corresponding to bright portions of the scene will receive more intense light than will light-sensitive elements corresponding to darker scene locations, and thus the elements corresponding to bright scene portions will accumulate more electrical charge. At the end of the exposure time, the charge accumulation is stopped, either by using a shutter to interrupt the light falling on sensor 103, or by shifting the charge into storage elements in sensor 103. The charges are then typically read out of sensor 103, and the quantity of charge accumulated at each location is measured and converted to a number, typically using an analog-to-digital (A/D) converter. Often, larger numbers represent brighter scene locations, although the opposite arrangement is possible.

Once the charges have been quantified, an array of numbers results. Each number corresponds to a particular scene location, and represents the brightness of that scene location. This array may be called a digital image, a digital photograph, or simply an image.

The term "pixel" is often used to refer to a particular scene location, its corresponding light-sensitive element, and the numerical value resulting from measuring the charge in the light-sensitive element. "Pixel" may even refer to a set of numerical values associated with a scene location, each of the values representing a different color, as explained below. "Pixel" is a shortening of the term "picture element." Whether the term "pixel" is referring to a scene location, a sensor element, or a numerical value, or a set of numerical values is generally clear from the context of the reference.

In many cameras, certain sensor pixels may have optical filters applied so that each pixel integrates light from only a subset of the visible spectrum. For example, in simplified terminology, some pixels may have filters that transmit only wavelengths corresponding to red light, some pixels may have filters that transmit only wavelengths corresponding to green light, and some pixels may have filters that transmit only wavelengths corresponding to blue light. The pixels may be referred to as "red pixels," "green pixels," and "blue pixels" respectively. Using such a sensor, it is possible to take color photographs. One of skill in the art will recognize that the invention may easily be embodied in a camera without color filters, often called a "black and white" camera.

FIG. 2 depicts a simplified schematic representation of an electronic array light sensor with red, green, and blue pixels in a common arrangement called a Bayer pattern. An actual sensor may have many thousands or millions of pixels, but the simplified representation in FIG. 2 will serve to explain an example embodiment of the invention. Many other arrangements of color filters are possible, and one of skill in the art will recognize that the invention may be embodied in cameras with other color filter arrangements.

The array in FIG. 2 may also be thought of as representing the array of numerical values in a digital image, each numerical value corresponding to a sensor pixel. The numbers shown on the left and top edges of the array in FIG. 2 are for convenience in referring to a particular pixel. For example, at row 0, column 0 is a pixel marked "R", indicating that that particular pixel has a red filter on it. This pixel's numerical value can be referred to as $R_{0,0}$. At row 0, column 1 is a green pixel, marked with a "G", having numerical value $G_{0,1}$.

The numerical pixel values may be used to compute an edge-detect figure of merit (FOM) for a particular digital image. An edge-detect FOM measures brightness changes between pixels relatively near each other in the image, and is an indication of high-frequency content in an image. For example, in the example array of FIG. 2, one way to compute an edge-detect FOM is to sum the absolute values of the differences between horizontally-adjacent pixels of like color. In this formulation, the red component of the FOM is:

$$\text{Red\_sum} = |R_{0,0} - R_{0,2}| + |R_{0,2} - R_{0,4}| + |R_{0,4} - R_{0,6}| + \\ |R_{2,0} - R_{2,2}| + |R_{2,2} - R_{2,4}| + |R_{2,4} - R_{2,6}| + \\ |R_{4,0} - R_{4,2}| + |R_{4,2} - R_{4,4}| + |R_{4,4} - R_{4,6}|$$

The blue component is:

$$\text{Blue\_sum} = |B_{1,1} - B_{1,3}| + |B_{1,3} - B_{1,5}| + |B_{1,5} - B_{1,7}| + \\ |B_{3,1} - B_{3,3}| + |B_{3,3} - R_{3,5}| + |B_{3,5} - B_{3,7}| + \\ |B_{5,1} - B_{5,3}| + |B_{5,3} - B_{5,5}| + |B_{5,5} - B_{5,7}|$$

And the green component is:

$$\text{Green\_sum} = |G_{0,1} - G_{0,3}| + |G_{0,3} - G_{0,5}| + |G_{0,5} - G_{0,7}| + \\ |G_{1,0} - G_{1,2}| + |G_{1,2} - G_{1,4}| + |G_{1,4} - G_{1,6}| + \\ |G_{2,1} - G_{2,3}| + |G_{2,3} - G_{2,5}| + |G_{2,5} - G_{2,7}| + \\ |G_{3,0} - G_{3,2}| + |G_{3,2} - G_{3,4}| + |G_{3,4} - G_{3,6}| + \\ |G_{4,1} - G_{4,3}| + |G_{4,3} - G_{4,5}| + |G_{4,5} - G_{4,7}| + \\ |G_{5,0} - G_{5,2}| + |G_{5,2} - G_{5,4}| + |G_{5,4} - G_{5,6}|$$

The edge-detect FOM is then Red_sum+Green_sum+Blue_sum.

More detail in the image, also called high-frequency content, will tend to increase the value of the FOM, so a more detailed image will have a higher FOM than a less-detailed image. Thus the edge-detect FOM alone does not give an indication of blur in the image.

However, blur in an image tends to reduce high-frequency content. Because at least two common sources of blur, camera shake and subject motion, are often cyclical, or reciprocating, those sources tend to introduce a varying amount of blur. By tracking changes in the edge-detect FOM over time, it is possible to compute a measure of image stability.

A camera typically takes several preliminary digital images of a scene in preparation for taking a final photograph. These preliminary digital images may be used to provide the user with a preview of the photograph (often shown on display 109 in real time), for exposure determination, for focusing, or for other purposes. Each preliminary digital image is taken in the way described earlier: the sensor is initialized, light is allowed to fall on the sensor and charge to accumulate, the exposure is stopped, and the charge quantities in the sensor pixels are quantified and arranged into a numerical array. These preliminary photographs may be taken in rapid succession. The preliminary images may use all of the pixels available on the sensor 103 or any subset of the available pixels. In accordance with an example embodiment of the invention, a camera may use all preliminary photographs taken for various purposes in its estimation of image blur, or may take preliminary photographs for the sole purpose of estimating image blur, or a combination of both.

A final photograph is the photograph for which the preliminary photographs help prepare the camera, and is typically stored in the camera's storage 111.

Image blur due to camera shake or subject motion may be estimated by examining the variability of the edge-detect FOM over time. A convenient measure of the variability of data is the standard deviation. In accordance with an example embodiment of the invention, image blur may be estimated using the standard deviation of the edge-detect FOM values computed from the most recent few preliminary digital photographs.

The standard deviation of a set of numbers $x_1, x_2, x_3 \ldots x_n$ is commonly given as:

$$SDDEV(x_1, x_2, x_3 \ldots x_n) = \sqrt{\frac{\sum_{1}^{n}(x_i - \bar{x})^2}{(n-1)}}$$

where $\bar{x}$ is the mean of the values $x_1, x_2, x_3 \ldots x_n$.

So designating the edge-detect FOM values from n successive preliminary photographs as $FOM_1, FOM_2, \ldots FOM_n$, a stability measure $S_1$ can be computed as $S_1 = SDDEV(FOM_1, FOM_2, \ldots FOM_n)$ After another preliminary photograph is taken, its edge-detect FOM may be designated $FOM_{n+1}$. Then the most recent n FOM readings will be $FOM_2, FOM_3, \ldots FOM_{n+1}$, and a new stability measure $S_2$ may be computed as the standard deviation of the most recent n FOM readings:

$S_2 = SDDEV(FOM_2, FOM_3, \ldots FOM_{n+1})$

Table 1 below shows 20 successive edge-detect FOM readings from a scene with the camera both handheld and supported on a tripod. Stability measures are also shown starting when enough FOM readings have been accumulated to compute a standard deviation. Each stability measure is the standard deviation of the previous six FOM readings.

TABLE 1

| Photo Number | FOM Tripod | FOM Handheld | S Tripod | S Handheld |
|---|---|---|---|---|
| 1 | 980 | 997 | | |
| 2 | 974 | 981 | | |
| 3 | 972 | 862 | | |
| 4 | 978 | 973 | | |
| 5 | 975 | 975 | | |
| 6 | 973 | 977 | 3.0 | 49.1 |
| 7 | 973 | 917 | 2.1 | 48.2 |
| 8 | 983 | 902 | 4.1 | 48.0 |
| 9 | 974 | 970 | 3.9 | 33.6 |
| 10 | 974 | 956 | 3.8 | 32.1 |
| 11 | 983 | 938 | 4.9 | 29.7 |
| 12 | 972 | 979 | 5.0 | 30.2 |
| 13 | 977 | 971 | 4.7 | 28.7 |
| 14 | 981 | 885 | 4.3 | 34.8 |
| 15 | 980 | 834 | 4.2 | 56.5 |
| 16 | 984 | 977 | 4.4 | 59.3 |
| 17 | 978 | 974 | 4.0 | 61.9 |
| 18 | 969 | 934 | 5.1 | 58.4 |
| 19 | 977 | 981 | 5.1 | 60.0 |
| 20 | 979 | 956 | 4.9 | 56.0 |

Figure 3A:
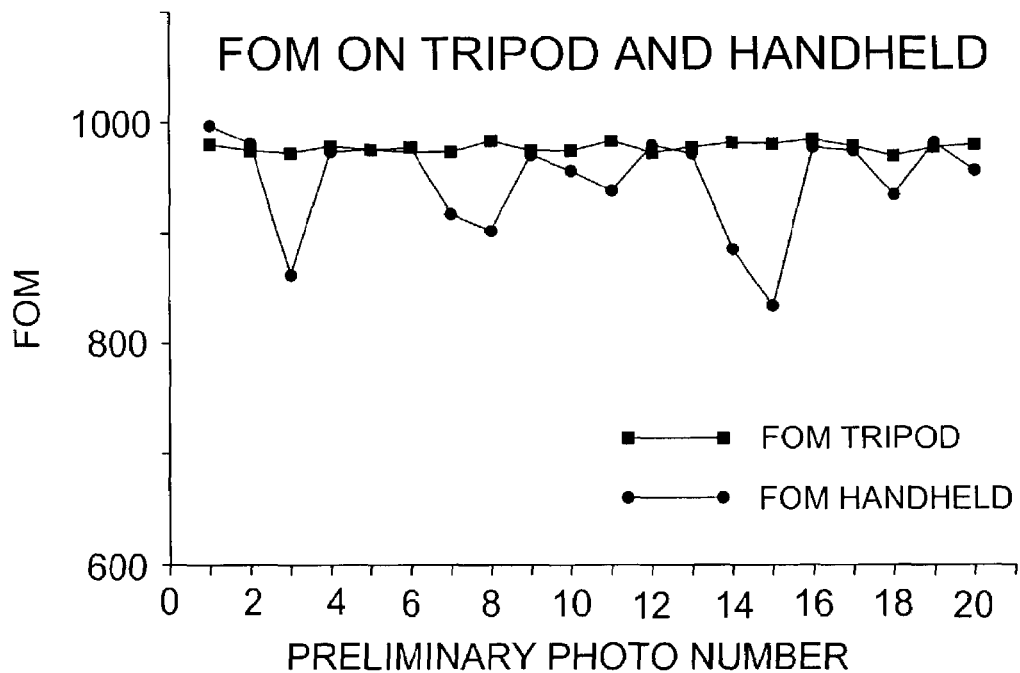
FIG. 3A shows edge-detect figure-of-merit (FOM) readings for both tripod-mounted and handheld cases.
Figure 3B:
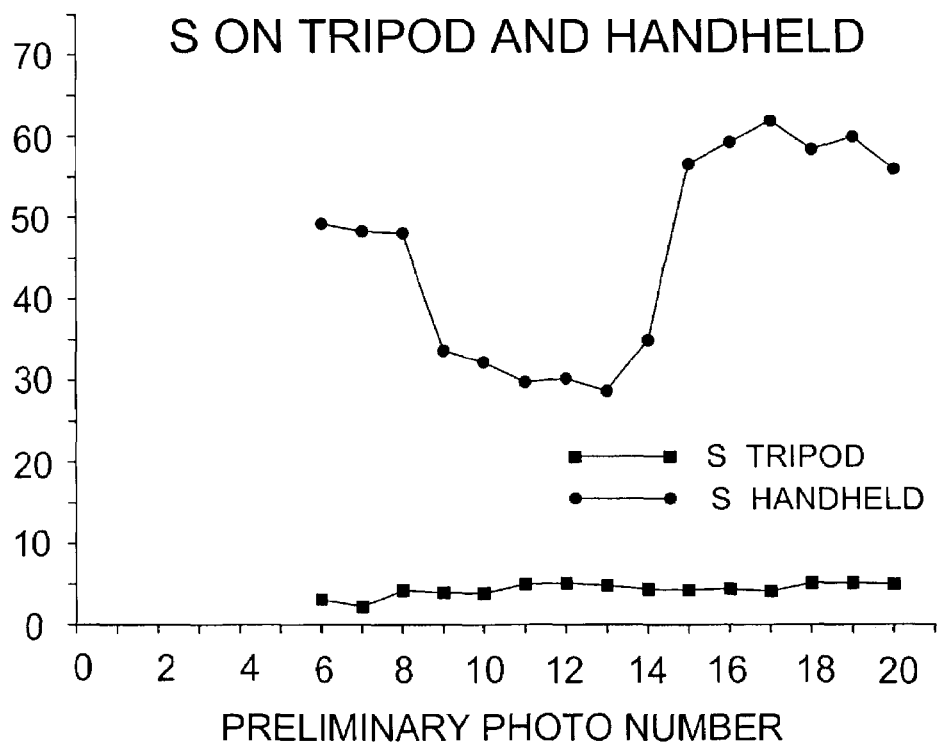
FIG. 3B shows stability measure S computed from the FOM readings of FIG. 3A.

FIGS. 3A and 3B show the data from Table 1 in graphical form. FIG. 3A shows edge-detect FOM readings for both tripod-mounted and handheld cases. FIG. 3B shows stability measure S computed from the FOM readings of FIG. 3A. Even though the FOM readings for the tripod and handheld cases are generally of similar magnitude, the stability measure S provides a means of quantifying possible blur in photographs that may be taken. The data in Table 1 show that when the camera is on a tripod, in which case camera shake is likely to be minimal, the stability measure S is low. When the camera is handheld, in which case camera shake is likely to be more pronounced than in the tripod case, the stability measure S is higher.

Other techniques may be used within the scope of the appended claims to compute the edge-detect FOM, the stability measure S, or both. For example, the edge-detect FOM could be computed by summing the absolute values of differences between vertically-adjacent pixels of the same color, rather than horizontally-adjacent pixels. Diagonally-adjacent pixels could also be used, or some combination of all of these. Similarly, the squares of the differences in pixel values may be used instead of the absolute values. Or pixels merely proximate and not necessarily adjacent may be used. Proximate pixels may be separated by a small number of other pixels. A number of multicolored pixels may be combined to create a super-pixel, which is then subtracted from other super-pixels to form the FOM.

The stability measure S might be computed using the variance of the past few FOM measurements instead of the standard deviation. The variance is the square of the standard deviation. Other techniques may be envisioned that quantify the variability of the edge-detect FOM over time. While the foregoing method results in a stability measure for which a higher value indicates more blur, methods could be envisioned wherein a higher value for the stability measure indicates less blur.

Figure 4:
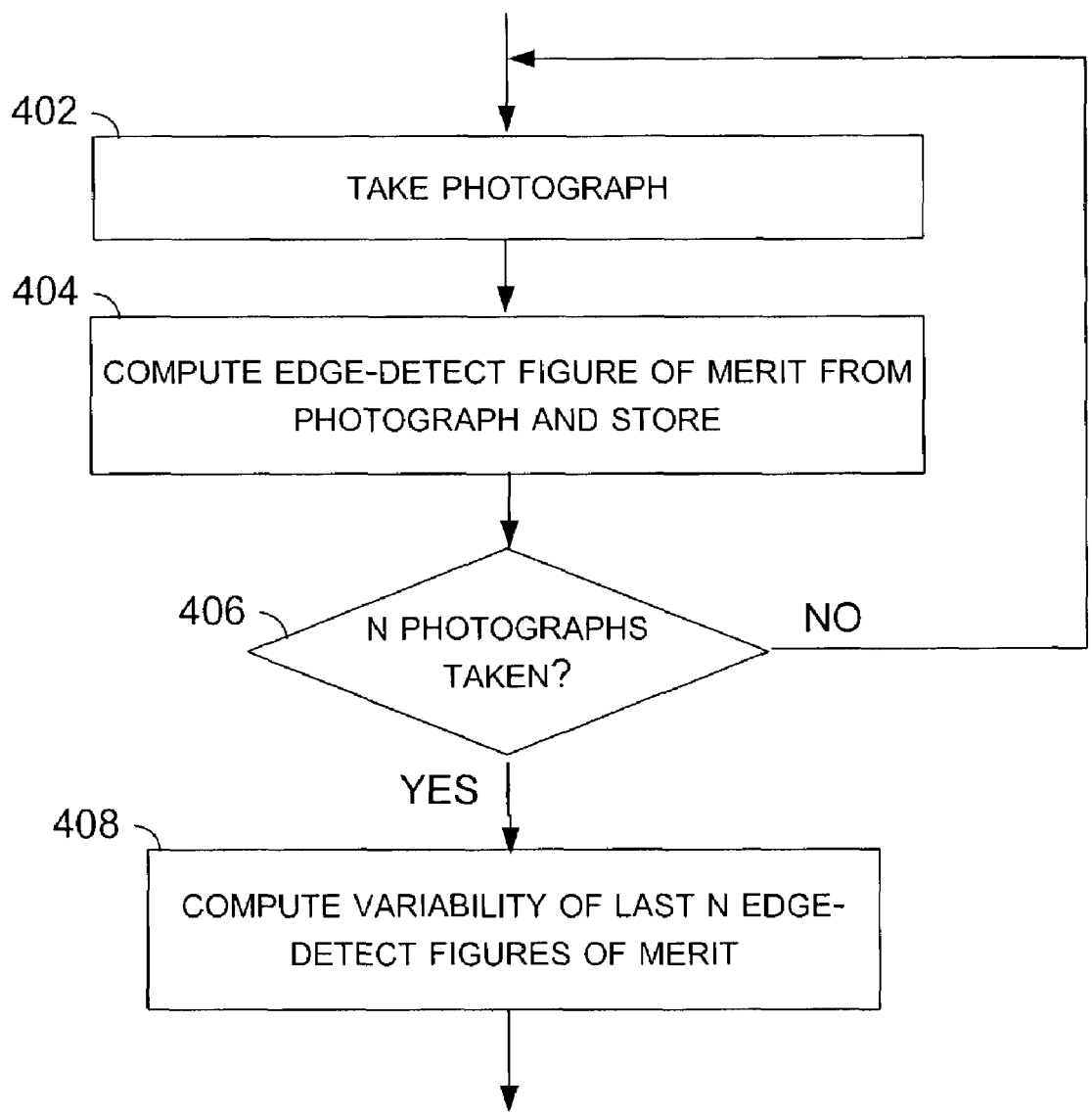
FIG. 4 depicts a flowchart demonstrating a method for computing a stability measure in accordance with an example embodiment of the invention.

FIG. 4 depicts a flowchart demonstrating a method for computing a stability measure in accordance with an example embodiment of the invention. In step 402, a preliminary photograph is taken. In step 404, an edge-detect figure of merit is computed from the preliminary photograph and stored. Decision block 406 tests to see if N preliminary photographs have been taken. If not, control branches back to step 402, wherein another preliminary photograph is taken and analyzed. If N preliminary photographs have been taken, control drops through to step 408 where the variability of the last N figures of merit is computed. This variability is stability measure S.

Figure 5:
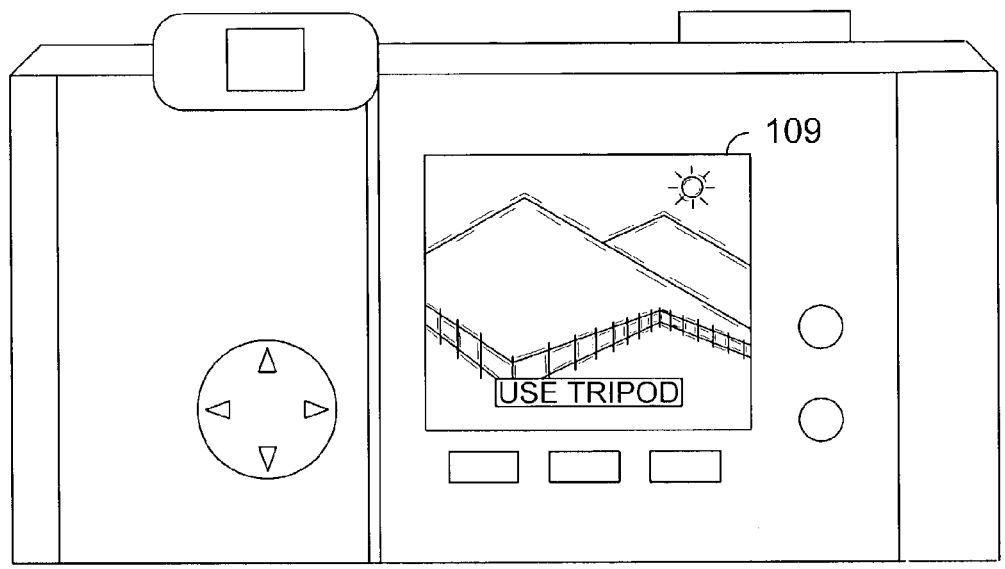
FIG. 5 depicts a portion of a camera user interface in accordance with an example embodiment of the invention.

Stability measure S can be used by the camera in a variety of ways for the photographer's benefit. The camera may use the stability information to warn the photographer of the danger of image blur, to suggest camera setting changes that will likely improve the resulting photograph, or to help explain blur in a photograph after the photograph has been taken. For example, using the blur estimation method illustrated in FIGS. 3A and 3B, the camera may determine that a stability measure of less than a predetermined value indicates a stable image, but a reading of more than the predetermined value indicates that blur is likely in a final photograph. In the example of FIGS. 3A and 3B, when the stability reading S exceeds 10, the camera may warn the user by suggesting techniques for improving the image. For example, FIG. 5 depicts a portion of a camera user interface in accordance with an example embodiment of the invention. The camera has determined that blur in the final photograph is likely, and uses the camera's display 109 to suggest placing the camera on a tripod to improve the results. In this example, the camera simply superimposes the suggestion "Use Tripod" over the preview image in display 109. While FIG. 5 depicts a flat panel display incorporated into the exterior of the camera, display 109 could also be a microdisplay viewed through a viewfinder-like portal in the camera, and not necessarily visible upon casual inspection of the camera.

The camera may take other parameters into account in deciding what setting changes to recommend to improve the photograph. For example, if the camera's automatic exposure system has selected a very fast shutter speed, it will likely be possible to take an unblurred photograph even though the camera or subject is moving considerably. In this case, the camera may recognize that a high quality photograph is likely, and not warn the user of any impending problem. The camera may change the threshold for S that will trigger a warning as a function of shutter speed.

Many cameras have zoom lenses, allowing the photographer to select a lens focal length appropriate for a particular situation. A longer focal length lens projects a larger image onto the camera sensor 103, thus also magnifying the effects of camera shake. Many modern cameras allow the camera logic 110 to control and monitor the lens focal length. When significant image blur is detected and the camera recognizes that the lens is set to a long focal length, the camera may conclude that the image blur is likely due to camera shake and recommend that the camera be mounted on a tripod or otherwise held still.

The camera's flash or strobe setting may also be considered. By adding light to a scene using a strobe, the camera may allow a photograph to be taken with a faster shutter speed, therefore reducing the effect of camera shake or subject motion. If the strobe is the predominant source of light for the photograph, then the duration of the light emitted by the strobe acts as an effective shutter, resulting in a very fast effective shutter speed. Any camera or subject motion can often be "frozen" using a strobe. If significant blur is detected, the camera may recommend that the photographer enable the camera's strobe. If the camera's strobe is already enabled, such as in an automatic mode, the camera may choose to use the strobe when possible blur is detected, even if it may otherwise be possible to take a properly-exposed photograph.

However, the camera strobe is typically of limited power, and can sufficiently illuminate only objects that are relatively near the camera. The camera's effective strobe range depends on several factors, including the light-emanating capability of the strobe, the camera's ISO speed setting and the lens aperture, but is typically a few feet or less. If the photographic subject is beyond the effective strobe range of the camera, the strobe will have little effect.

Many cameras have an automatic focus capability, wherein the camera logic 110 controls the lens so as to achieve proper focus. Consequently, the camera logic 110 has information about the distance from the camera to the in-focus subject of a photograph. The camera may use this information in determining what setting changes to recommend. If the subject is beyond the camera's effective strobe range, then the camera may not recommend using the strobe as the strobe is likely to have little effect on the resulting photograph. Similarly, if the scene, as measured by the camera's automatic exposure determination, is very bright, then using the strobe may have little effect and the camera may not recommend using the strobe to minimize image blur.

Table 2 below illustrates a possible decision-making method in accordance with an example embodiment of the invention. When no potential blur is detected, the camera may indicate to the user that the image is stable, or my simply make no indication. If potential blur is detected, the camera may choose a message or indication to make based on Table to or a similar decision-making tool.

TABLE 2

| Shutter Speed | Focal Length | Subject Distance | Scene Brightness | Strobe Mode | Example Message |
|---|---|---|---|---|---|
| Fast | Any | Any | Any | Any | "Stable" or none |
| Slow | Short | Far | Any | Any | "Use Tripod" |
| Slow | Long | Far | Any | Any | "Use Tripod or Reduce Zoom" |
| Slow | Any | Near | Any | On | "Use Tripod" |
| Slow | Long | Near | Low | Off | "Use Flash or Tripod" |
| Slow | Short | Near | Low | Off | "Use Flash" |
| Slow | Any | Near | High | Off | "Use Tripod" |

Figure 6:
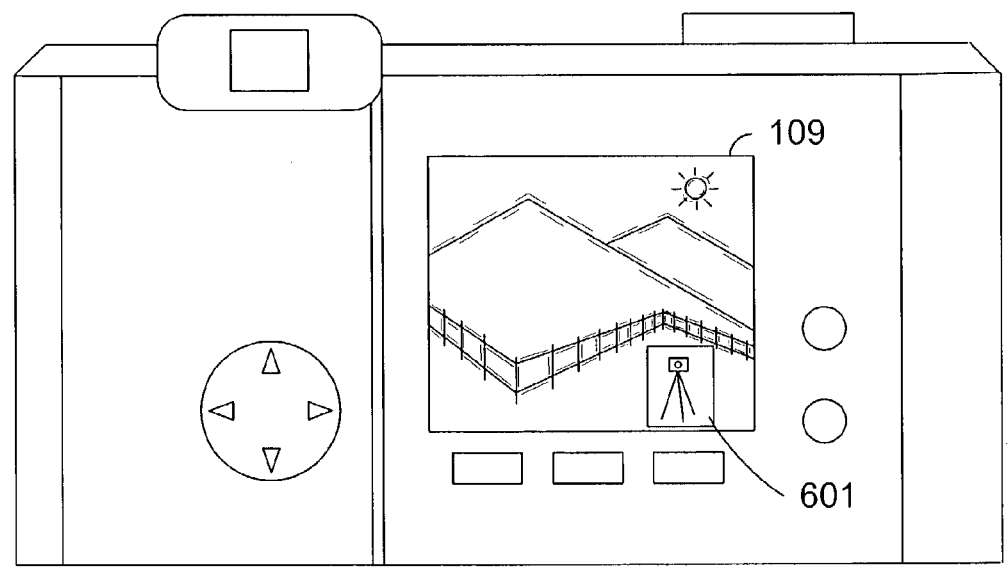
FIG. 6 depicts a camera display that uses an icon to suggest to the photographer that the camera be placed on a tripod.

Of course, other decision tables are possible within the scope of the appended claims. In addition, the camera may use an icon or other symbol rather than a textual message to communicate its suggestion. FIG. 6 depicts a camera display that uses an icon 601 to suggest to the photographer that the camera be placed on a tripod. Icon 601 is a stylized representation of a camera on a tripod, and may be superimposed onto an image in display 109.

The camera may be configured to display its warning message in display 109 while the photographer is composing her photograph, or at other times. For example, many cameras include an optical viewfinder that gives the photographer an alternative method of composing photographs that does not use a preview image on display 109. Photographers often use the optical viewfinder rather than the live preview display for composition in order to conserve camera battery power. However, many cameras briefly display each photograph taken, even if the display 109 was not used for composition. A camera in accordance with an example embodiment of the invention may display its warning message on this brief display in order to let the photographer know that the photograph just taken may be blurred, and to suggest alternate camera settings for re-taking an improved photograph.

Figure 7:
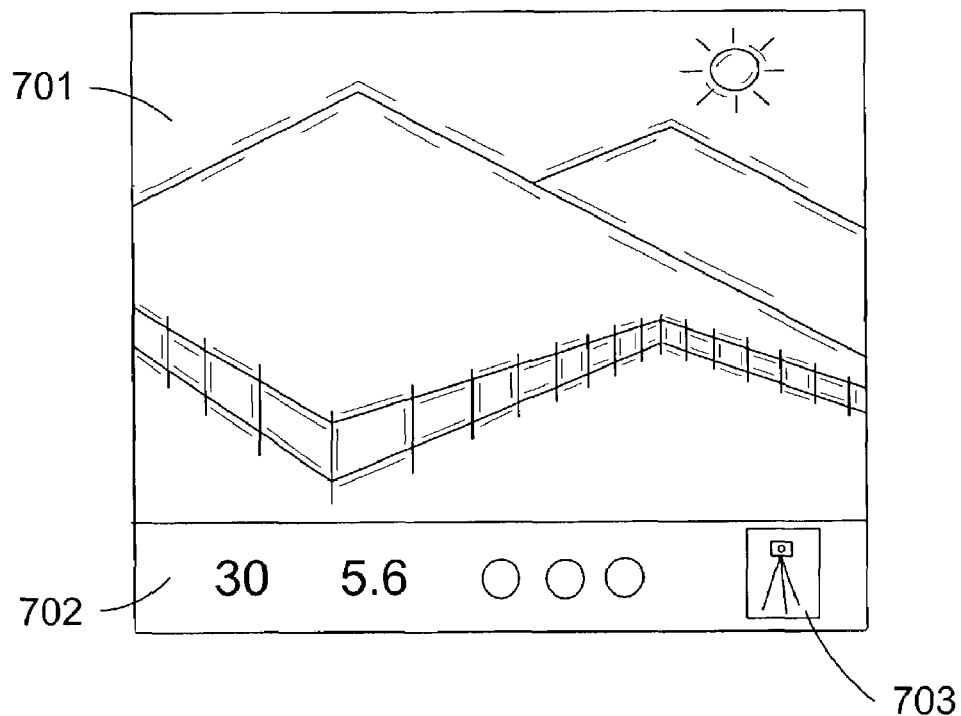
FIG. 7 depicts an optical viewfinder with additional information in accordance with an example embodiment of the invention.

A film camera in accordance with an example embodiment of the invention will likely not have a digital display such as display 109, but may display photographic information around the field of view of an optical viewfinder. FIG. 7 depicts an optical viewfinder with additional information in accordance with an example embodiment of the invention. In such a viewfinder, the image area 701 is a view of the scene visible directly to the photographer through a set of optics. Information area 702 presents various signals and information about the configuration of the camera, often using illuminated indicators positioned to appear adjacent the scene in image area 701. Data presented in information area 702 may include the shutter speed and aperture currently selected, focus indication, and the like. Icon 703 is a stylized representation of a camera on a tripod, and may be made visible to indicate to the photographer that potential blur has been detected and that stabilizing the camera may improve the impending photograph.

A camera may also associate its message for suggesting alternative settings with a copy of the digital photograph stored in camera storage unit 111. For example, the message may be stored as a custom tag in a file format such as the Tagged Image File Format (TIFF), or may be associated with another kind of image format. The message may then be accessed and displayed while a photographer is later viewing her photographs on the camera's display 109.

Where the message is associated with the image file, the message is also available after the digital photograph has been transferred to another device. For example, many photographers upload their digital images to a computer for storage, further processing, or transmitting to others. Image editing or viewing software running on a computer may enable display of the message. Transferring the digital images and associated messages may be accomplished through a cable with appropriate interfaces, a wireless link, or by physically moving a storage medium such as a floppy disk or memory module.

Figure 8:
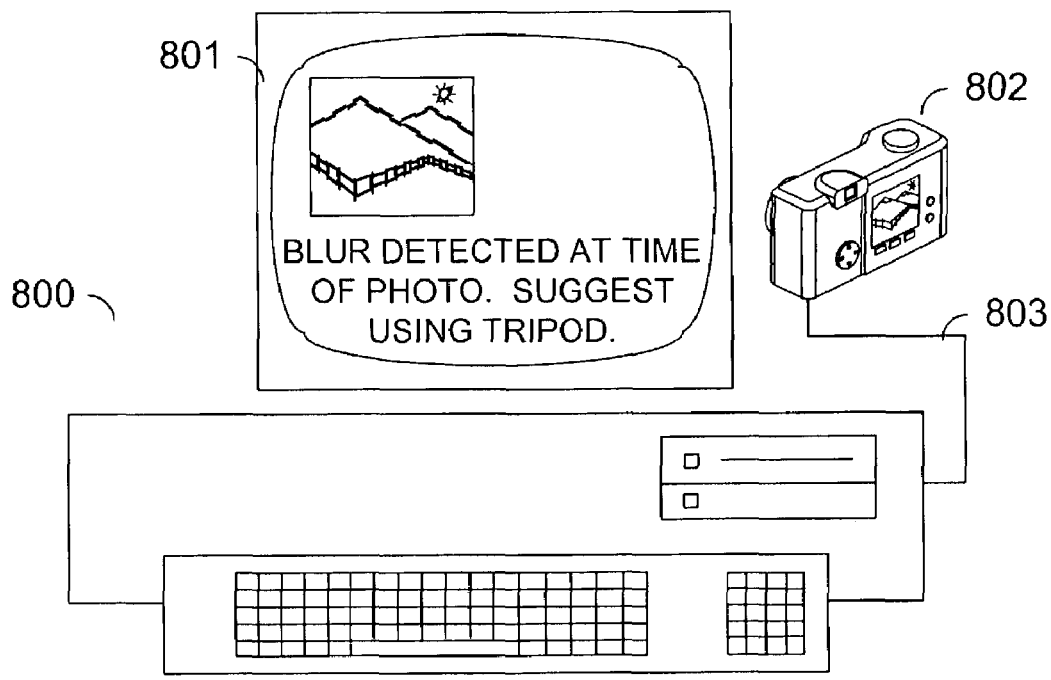
FIG. 8 depicts a system in accordance with an example embodiment of the invention.

FIG. 8 depicts a system in accordance with an example embodiment of the invention. Computer 800 connects to camera 802 through link 803 and receives image data from camera 802. Images may be displayed on display 801, and software on the computer may allow the user to edit, manage, and distribute digital images. As shown in FIG. 8, the software may extract a diagnostic message that was associated with an image file by the camera, and display the message so that the user may understand a possible cause of blur in a photograph.

Figure 9:
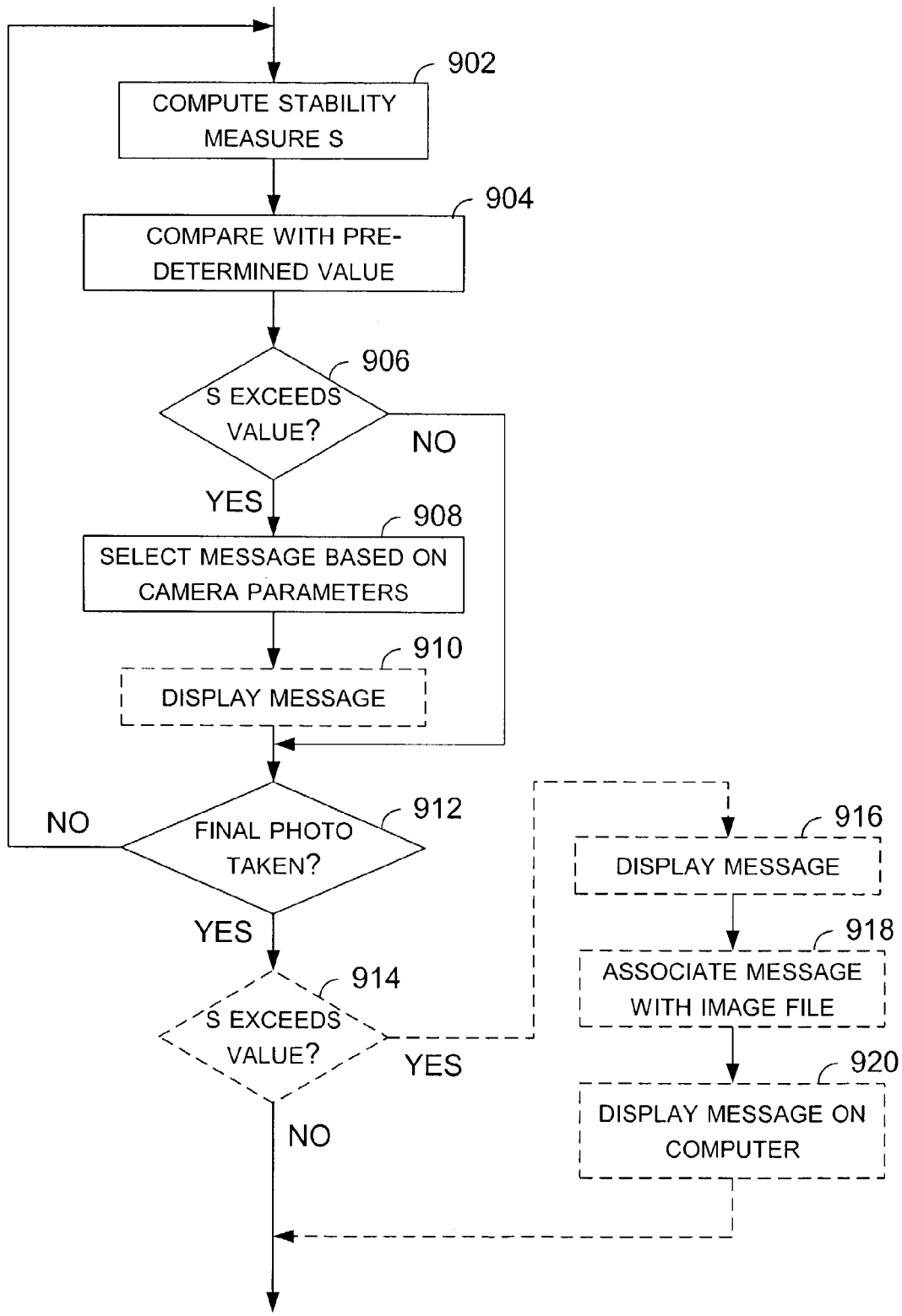
FIG. 9 shows a flowchart of a method of using a stability measure in accordance with an example embodiment of the invention.

FIG. 9 shows a flowchart of a method of using a stability measure in accordance with an example embodiment of the invention. The method of FIG. 9 may be performed by camera logic 110, typically by a microprocessor executing a stored program. Parts of the method may be performed outside of the camera, for example in a computer. At step 902, the stability measure S is computed. At step 904, the measure is compared to a predetermined value to ascertain whether blur is likely in a photograph. Decision block 906 routes execution differently depending on the result of the comparison. If S is larger that the predetermined value, a message is selected at step 908. The message is selected based on various photographic parameters. In optional step 910, the message may be displayed prior to a final photograph being taken.

At decision step 912, execution may proceed back to step 902 if no indication has been received that a final photograph is to be taken. Branching back to step 902 may be typical of a camera that repeatedly computes and uses a stability measure using preliminary photographs in a preview mode. The camera may use a shutter release switch with two or more positions often called S1 and S2. The preview mode may be initiated by depressing the shutter release switch to the S1 position. Taking a final photograph may be initiated by depressing the shutter release switch fully, to the S2 position. The control that the photographer uses to initiate picture taking is often called a shutter release switch or button even if the camera is entirely electronic and has no actual shutter.

If such an indication has been received, for example, the photographer has fully depressed the camera's shutter release, the camera may proceed to optional steps 914-920. In step 914, S may be compared with the pre-determined value. The message may be displayed on the camera in optional step 916 (now after a final photograph has been taken), the message may be associated with an image file in step 918, or the message may be displayed on a computer in step 920. Typically step 920 would occur after the photograph has been transferred to the computer. Optional steps 910, 916, 918, and 920 are not mutually exclusive. Any combination of them may be performed.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A camera, comprising:
   a) an electronic array light sensor; and
   b) logic that receives data from the electronic array light sensor; the logic configured to perform the following method:
      i. taking successive digital photographs;
      ii. computing an edge-detect figure of merit value for each of at least two digital photographs, wherein the computing an edge-detect figure of merit value comprises summing absolute values of differences in numerical value between proximate pixels of like colors; and
      iii. computing a variability of the edge-detect figure of merit values.

2. A camera, comprising:
   a) an electronic array light sensor; and
   b) logic that receives data from the electronic array light sensor; the logic configured to perform the following method:
      i. taking successive digital photographs;
      ii. computing an edge-detect figure of merit value for each of at least two digital photographs, wherein computing an edge-detect figure of merit value comprises summing squares of differences in numerical value between proximate; and
      iii. computing a variability of the edge-detect figure of merit values.

3. A camera, comprising:
   a) an electronic array light sensor; and
   b) logic that receives data from the electronic array light sensor; the logic configured to perform the following method:
      i. taking successive digital photographs;
      ii. computing an edge-detect figure of merit value for each of at least two digital photographs, wherein computing an edge-detect figure of merit value comprises summing squares of differences in numerical value between proximate pixels of like colors; and
      iii. computing a variability of the edge-detect figure of merit values.

4. A camera, comprising:
   a) an electronic array light sensor; and
   b) logic that receives data from the electronic array light sensor; the logic configured to perform the following method:
      i. taking successive digital photographs;
      ii. computing an edge-detect figure of merit value for each of at least two digital photographs; and
      iii. computing a variability of the edge-detect figure of merit values,
   wherein computing a variability of the edge-detect figure of merit values comprises computing a standard deviation of the values.

5. A camera, comprising:
   a) an electronic array light sensor; and
   b) logic that receives data from the electronic array light sensor; the logic configured to perform the following method:

i. taking successive digital photographs;
ii. computing an edge-detect figure of merit value for each of at least two digital photographs; and
iii. computing a variability of the edge-detect figure of merit values, wherein computing a variability of the edge-detect figure of merit values comprises computing a variance of the values.

* * * * *

UNITED STATES PATENT AND TRADEMARK OFFICE
CERTIFICATE OF CORRECTION

PATENT NO. : 7,379,091 B2 Page 1 of 1
APPLICATION NO. : 10/427300
DATED : May 27, 2008
INVENTOR(S) : Jason E. Yost et al.

It is certified that error appears in the above-identified patent and that said Letters Patent is hereby corrected as shown below:

In column 10, line 21, in Claim 1, delete "colors" and insert -- color --, therefor.

In column 10, line 34, in Claim 2, delete ";" and insert -- pixels; --, therefor.

In column 10, line 47, in Claim 3, delete "colors" and insert -- color --, therefor.

Signed and Sealed this

Thirtieth Day of September, 2008

JON W. DUDAS
*Director of the United States Patent and Trademark Office*